US00RE46919E

(19) United States
(12) Reissued Patent
Lee et al.

(10) Patent Number: US RE46,919 E
(45) Date of Reissued Patent: Jun. 26, 2018

(54) DISPLAY DEVICE AND METHOD FOR CONTROLLING DISPLAY IMAGE

(71) Applicant: Samsung Display Co., Ltd., Yongin, Gyeonggi-do (KR)

(72) Inventors: Hyun-Jae Lee, Yongin (KR); Jung-Soo Rhee, Yongin (KR); Kyung-Hyun Ko, Yongin (KR)

(73) Assignee: Samsung Display Co., Ltd., Gyeonggi-do (KR)

(21) Appl. No.: 15/389,263

(22) Filed: Dec. 22, 2016

Related U.S. Patent Documents

Reissue of:
(64) Patent No.: 9,299,314
Issued: Mar. 29, 2016
Appl. No.: 13/829,093
Filed: Mar. 14, 2013

(30) Foreign Application Priority Data

Oct. 29, 2012 (KR) ..... 10-2012-0120616

(51) Int. Cl.
*G09G 5/00* (2006.01)
*G06F 3/0488* (2013.01)
(Continued)

(52) U.S. Cl.
CPC ..... *G09G 5/006* (2013.01); *G06F 1/3212* (2013.01); *G06F 1/3265* (2013.01);
(Continued)

(58) Field of Classification Search
CPC .... G06F 3/0488; G06F 3/0412; G06F 3/0485; G06F 3/03547; G06F 2203/0339
(Continued)

(56) References Cited

U.S. PATENT DOCUMENTS 7,088,343 B2 * 8/2006 Smith ..... G06F 1/1616 345/168
7,321,360 B1 * 1/2008 Goren ..... G06F 3/014 341/20
(Continued)

FOREIGN PATENT DOCUMENTS

EP 1 942 401 A1 7/2008
EP 2 157 772 A1 2/2010
(Continued)

OTHER PUBLICATIONS

Extended European Search Report dated Mar. 14, 2016 for European Patent Application No. EP 13 169 671.8, which cites the above-identified references numbered 1 and 8-9, and which shares priority of Korean Patent Application No. KR 10-2012-0120616 with U.S. Appl. No. 13/829,093, from which the subject Reissue Application is based.

*Primary Examiner* — Adam L Basehoar
(74) *Attorney, Agent, or Firm* — Knobbe Martens Olson & Bear LLP

(57) ABSTRACT

A flexible display device and a method for controlling a display image are disclosed. In one aspect, the flexible display device includes a first display which has a flat shape and a second display which is disposed on either side of the first display and has a curved surface bent at a boundary between the first and second displays. The display further includes a controller which controls a screen of at least one of the first and second displays according to a user touch and/or a battery capacity.

20 Claims, 14 Drawing Sheets

(51) Int. Cl.
*G06F 3/041* (2006.01)
*G06F 3/0485* (2013.01)
*G06F 3/0354* (2013.01)
*G06F 1/32* (2006.01)

(52) U.S. Cl.
CPC ..... *G06F 3/03547* (2013.01); *G06F 3/041* (2013.01); *G06F 3/0412* (2013.01); *G06F 3/0485* (2013.01); *G06F 3/0488* (2013.01); *G06F 2203/0339* (2013.01)

(58) Field of Classification Search
USPC ..... 345/1.3, 173, 204; 715/764, 774, 781, 715/784, 786, 810, 828–831, 833, 864
See application file for complete search history.

(56) References Cited

U.S. PATENT DOCUMENTS 8,386,958 B1 * 2/2013 Zavitaev ..... G06F 3/0236 345/168
8,412,278 B2 * 4/2013 Shin ..... G06F 3/04883 455/556.1
8,466,887 B2 * 6/2013 Lin ..... G06F 3/03547 345/173
2010/0048253 A1 2/2010 Park et al.
2010/0053861 A1 * 3/2010 Kim ..... H04M 1/236 361/679.01
2010/0117975 A1 * 5/2010 Cho ..... 345/173
2010/0120470 A1 5/2010 Kim et al.
2010/0156887 A1 * 6/2010 Lindroos ..... G06F 1/1626 345/418
2010/0171734 A1 * 7/2010 Chiu ..... 345/212
2010/0245267 A1 * 9/2010 Min et al. ..... 345/173
2011/0050657 A1 * 3/2011 Yamada ..... H01L 27/3293 345/204
2012/0274575 A1 * 11/2012 Solomon ..... G06F 1/1601 345/173
2013/0002133 A1 1/2013 Jin et al.
2013/0002572 A1 * 1/2013 Jin ..... G02F 1/133305 345/173
2013/0002583 A1 * 1/2013 Jin ..... G06F 1/1637 345/173
2013/0033434 A1 * 2/2013 Richardson ..... G06F 3/0488 345/173
2014/0267091 A1 * 9/2014 Kim ..... G06F 1/1652 345/173

FOREIGN PATENT DOCUMENTS

KR 10-0575717 B1 4/2006
KR 10-2008-0015668 A 2/2008
KR 10-2010-0023604 A 3/2010
KR 10-2010-0104363 A 9/2010
KR 10-0983726 B1 9/2010
KR 10-2013-0007311 A 1/2013

* cited by examiner

DISPLAY DEVICE AND METHOD FOR CONTROLLING DISPLAY IMAGE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED PATENT APPLICATION

This application claims the benefit of Korean Patent Application No. 10-2012-0120616, filed on Oct. 29, 2012, in the Korean Intellectual Property Office, the disclosure of which is incorporated herein in its entirety by reference.

BACKGROUND

1. Field

The described technology generally relates to a display device and a method for controlling a display image.

2. Description of the Related Technology

Flexible displays have been recently spotlighted as a new display technology. A flexible display is generally realized on a thin and bendable substrate which is formed of plastic or the like. Therefore, even if the flexible display is folded or rolled like a paper sheet, the flexible display is not damaged. A liquid crystal display (LCD) and an organic light-emitting display (OLED) each including a thin film transistor (TFT) are currently used to realize a flexible display.

SUMMARY

One inventive aspect is a user interface and a method for effectively controlling a display image of a flexible display device.

Another aspect is a display device including: a first display which has a flat shape; a second display which is disposed on either side of the first display and has a curved surface bent at a boundary between the first and second displays; and a controller which controls a screen of at least one of the first and second displays according to a touch of a user or a capacity of a battery.

The controller may detect a touch characteristic according to a combination of touch inputs of the first and second displays and generate an event according to the touch characteristic. If the touch characteristic includes a drag of the second display, the controller may generate the event in response to the drag. If the touch characteristic is consecutive drags of the first and second displays in an image selecting mode, the controller may zoom in or out an image, which is scrolled according to the drag of the first display, according to the drag of the second display. If the touch characteristic is the drag of the second display in a text input mode, the controller may scroll and output a text according to an up and down or left and right drag of the second display. The controller may substantially simultaneously generate the event and provide feedback to the user in response to the drag of the second display. The feedback may be a vibration or a sound.

The controller may control the screen of the at least one of the first and second displays to be turned on or off according to a left capacity of the battery. The controller may estimate a left time of the battery based on the left capacity of the battery and, if the left time is shorter than or equal to a reference time, may change a mode to a power control driving mode which is to turn off at least part of the screen of the at least one of the first and second displays. The left time may be calculated based on a current consumption and a temperature of the battery. The controller may measure a voltage of the battery and, if the voltage of the battery is lower than or equal to a reference voltage, may change a mode to a power control driving mode which is to turn off at least part of the screen of the at least one of the first and second displays.

Another aspect is a method for controlling a display image of a display device including a first display which has a flat shape and a second display which is disposed on either side of the first display and has a curved surface bent at a boundary between the first and second displays. The method may include: controlling a screen of at least one of the first and second displays based on a touch of a user or a capacity of a battery.

The control of the screen may include: receiving touch inputs of the first and second displays; detecting a touch characteristic according to a combination of the touch inputs; and generating an event according to the touch characteristic. The generation of the event may include: if the touch characteristic includes a drag of the second display, generating the event in response to the drag. The generation of the event may include: if the touch characteristic is a drag of the first display in an image selecting mode, scrolling an image according to the drag of the first display; and if the touch characteristic is detected as a drag of the second display subsequent to the drag of the first display, zooming in or out the scrolled image according to the drag of the second display. The generation of the event may include: if the touch characteristic is the drag of the second display in a text input mode, scrolling and outputting a text according to an up and down or left and right drag of the second display. The method may further include: substantially simultaneously generating the event and providing a feedback to the user.

The control of the screen may include: estimating a left time of the battery based on a left capacity of the battery; and if the left time is shorter than or equal to a reference time, changing a mode to a power control driving mode which is to turn off at least part of the screen of the at least one of the first and second displays. The estimation of the left time may include: estimating the left time based on a current consumption and a temperature of the battery. The control of the screen may include: measuring the voltage of the battery; and if the voltage of the battery is lower than or equal to a reference voltage, changing a mode to a power control driving mode which is to turn off at least part of the screen of the at least one of the first and second displays.

DETAILED DESCRIPTION

Figure 1:
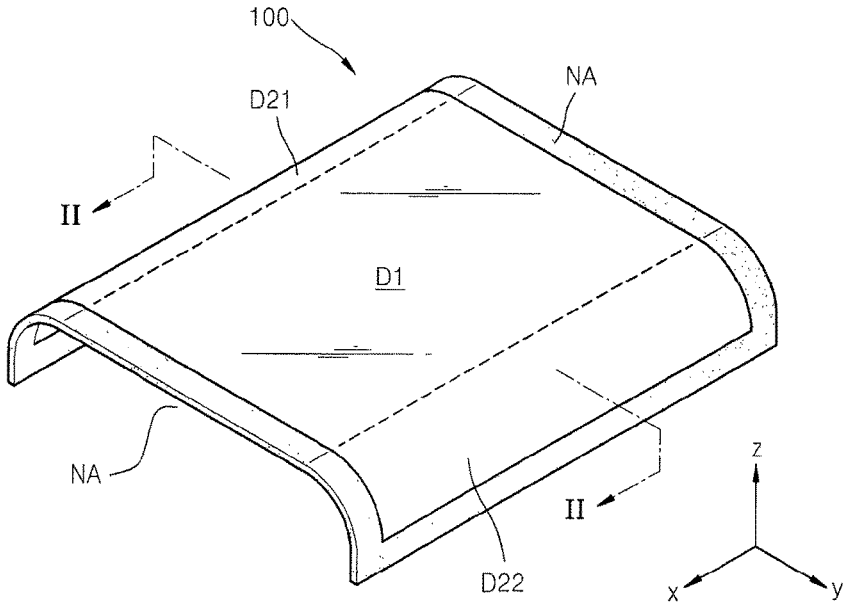
FIG. 1 is a schematic perspective view illustrating a flexible display panel according to an exemplary embodiment.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives thereof. Like numbers refer to like elements throughout the description of the figures.

It will be understood that, although the terms, 'first', 'second', etc. may be used herein to describe various elements, these elements should not be limited by these terms. These terms are only used to distinguish one element from another.

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In the drawings, the thicknesses of layers and regions may be exaggerated for clarity. In the drawings, the thicknesses of layers and regions may be exaggerated for clarity. It will also be understood that when a layer is referred to as being "on" another layer or substrate, it can be directly on the other layer or substrate, or intervening layers may also be present.

Hereinafter, embodiments will be described in detail with reference to the attached drawings.

Figure 2:
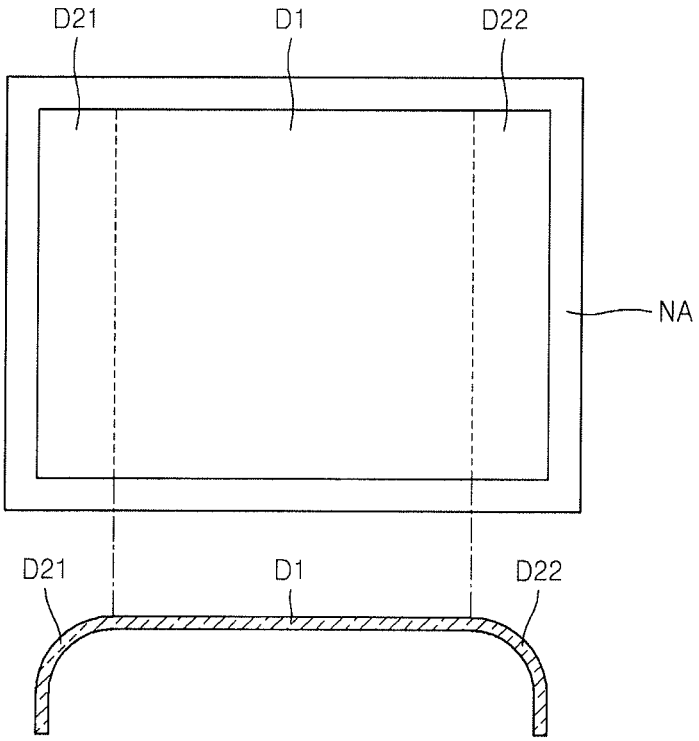
FIG. 2 is a plan view of the flexible display panel.

FIG. 1 is a schematic perspective view illustrating a flexible display panel 100 according to an exemplary embodiment. FIG. 2 is a plan view of the flexible display panel 100.

The flexible display panel 100 according to the present exemplary embodiment includes a first display D1 and a second display D2 (D21 and D22) disposed on either side of the first display D1. A non-display area NA is disposed at edges of the first and second displays D1 and D2.

Referring to FIGS. 1 and 2, the first display D1 is substantially flat and may be a main display screen of the flexible display panel 100.

The second display D2 is formed of a curved surface having a predetermined radius curvature. The second display D2 extends from the first display D1 to be connected to the first display D1. Since the second display D2 has the curved surface which is bent at a boundary between the first and second displays D1 and D2, a display screen of the flexible display device 100 is not limited to the first display D1 but extends the display screen up to the second display D2 for a user. In other words, a whole display screen may increase due to the second display D2. The second display D2 may be a sub-display screen of the flexible display panel 100.

If the flexible display panel 100 is installed in a small-size display device grabbed by a hand like a cellular phone or a personal digital assistant (PDA), the second display D2 forms the curve surface. Therefore, a grip sensitivity may increase, and an aesthetic sense may increase due to the curved surface.

The non-display area NA is disposed at the edges of the first and second displays D1 and D2. The non-display area NA may be folded inside not to be seen by the user.

The first and second displays D1 and D2 may include a plurality of pixels having various types of display devices (not shown), such as at least one or more organic light-emitting displays, liquid crystal displays (LCDs), electrophoretic devices, etc., and at least one or more thin film transistors (TFTs), and storage capacitors, etc.

The first and second displays D1 and D2 may display an image signal input from an image signal input unit. Therefore, all of the first and second displays D1 and D2 may function as one display screen.

However, the present invention is not limited thereto, and thus the first and second displays D1 and D2 may independently display the image signals input from the different image signal input units.

Figure 3:
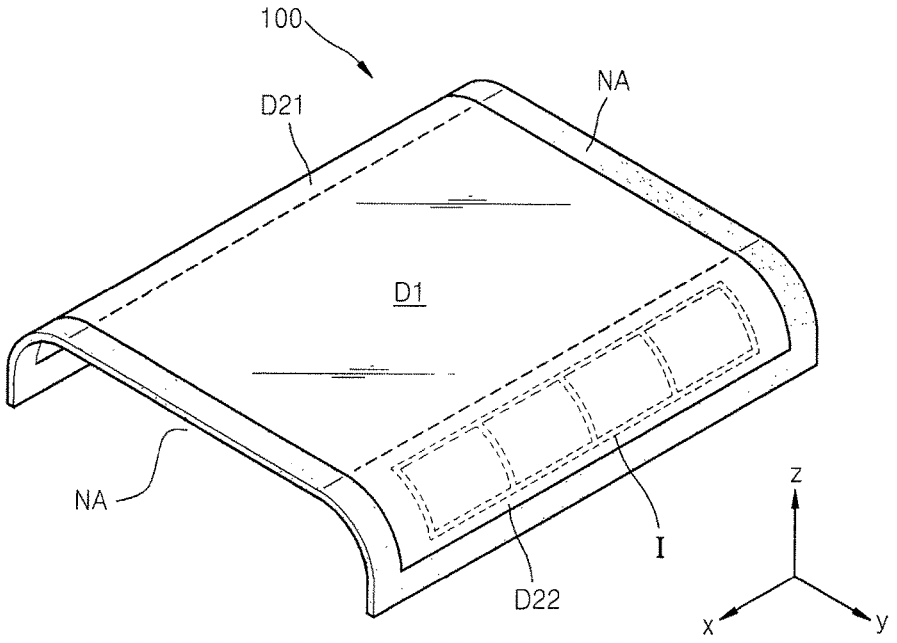
FIG. 3 is a schematic perspective view illustrating first and second displays of the flexible display panel which display image signals input from different image signal input units, according to an exemplary embodiment.
Figure 4A:
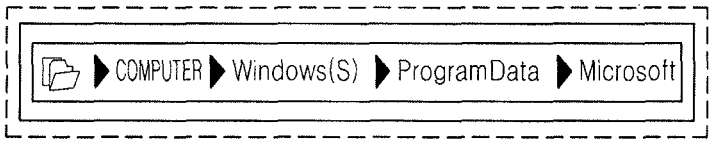
FIGS. 4A through 4C are schematic views illustrating information provided by the second display of FIG. 3, according to an exemplary embodiment.
Figure 4B:
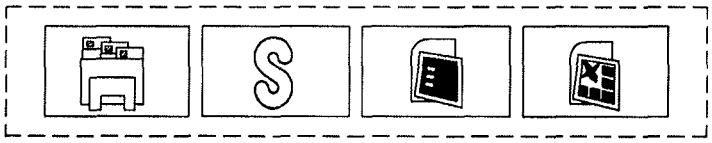
Figure 4C:
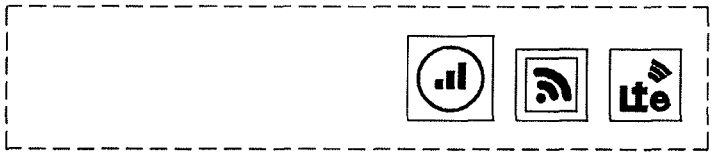

FIG. 3 is a schematic perspective view illustrating the first and second displays D1 and D2 of the flexible display panel 100 which display image signals input from different image signal input units, according to an exemplary embodiment. FIGS. 4A through 4C are schematic views illustrating information provided by the second display D2 of FIG. 3, according to an exemplary embodiment.

In the present exemplary embodiment, certain information may be provided to a user by using the second display D2, which is a bent side area of the flexible display panel 100, without damaging or stopping contents provided from the first display D1 which is a main display.

Referring to FIGS. 3 and 4A through 4C, the first display D1 may function as a main screen, and the second display D2 may function as sub screens such as various types of icons I.

As shown in FIG. 4A, the second display D2 may provide a user interface (UI) function which is to display a path or a depth of a folder. When the user performs a file management job such as a file search, a file copy, a file move, or the like, the second display D2 may display a path of a whole folder which is currently located.

Alternatively, as shown in FIG. 4B, the second display D2 may provide an intuitive UI function which is to display a multi-tasking bar. The second display D2 may provide a task progress state display and allow the user to directly select a task.

As shown in FIG. 4C, the second display D2 may provide a UI function which is to display certain information including, but not limited to, accounting information, network information, and so on. When the first display D1 provides a service and an application such as a moving picture, an Internet search, etc., the second display D2 may provide the user with accounting and network use information in real time without damaging or stopping information provided from the first display D1.

Figure 5:
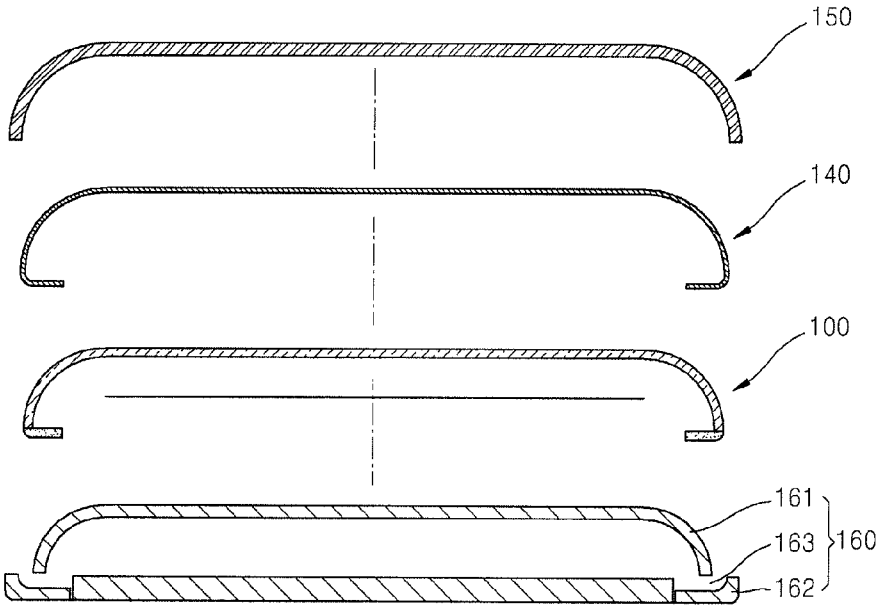
FIG. 5 is a schematic view illustrating a mounting type for combining a flexible display panel into a housing according to an exemplary embodiment.

FIG. 5 is a view illustrating a mounting type for combining a flexible display panel into a housing according to an exemplary embodiment.

The flexible display panel 100 whose curved surface is maintained by various types of support means may be integrated into various types of display devices. In some embodiments, examples of the display devices include a television (TV), a cellular phone, a smart phone, a notebook computer, a monitor, a digital broadcasting terminal, a PDA, a portable multimedia player (PMP), a navigation, etc.

Referring to FIG. 5, the flexible display panel 100 is combined into a display device. The display device includes a frame or housing 160 which protects and supports the display device. In the present exemplary embodiment, the flexible display panel 100 is bent so that the second display D2 forms the curved surface and is attached on an upper surface of a front case 161 of the housing 160. Also, the non-display area NA of the flexible display panel 100 is folded and placed in an opening 163 formed between the front case 161 and a lower case 162 of the housing 160. Therefore, the non-display area NA may be prevented from being seen outside the display device.

A touch panel 140 and a window 150 which is a transparent protective window are installed on an upper surface of a side of the flexible display panel 100 on which an image is realized. The touch panel 140 may include first and second touch areas respectively corresponding to the first and second displays D1 and D2. The touch panel 140 may adopt various types of touch methods such as a capacitive method, a resistive method, etc. The window 150 may protect the flexible display panel 100 from external shocks or scratches and operate as a support mean which maintains a shape of the flexible display panel 100.

Figure 6:
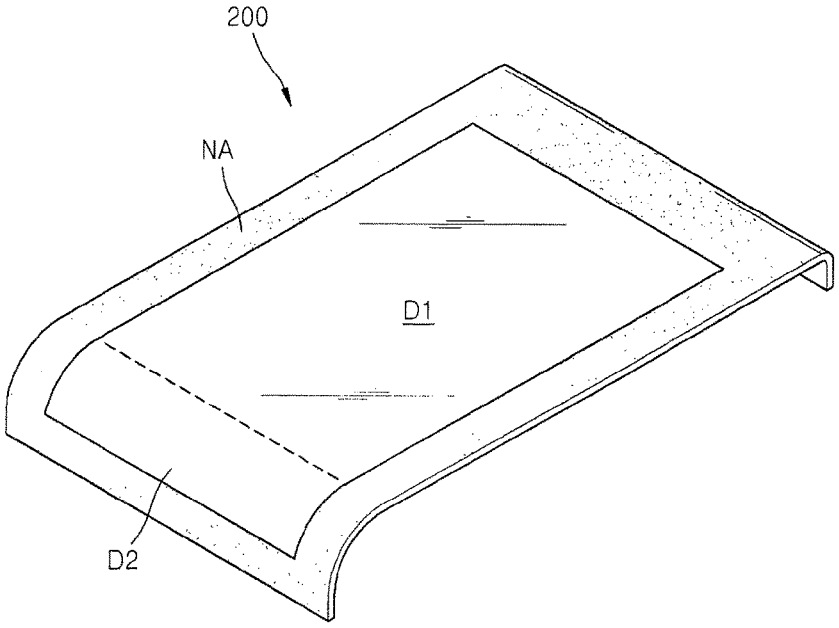
FIG. 6 is a schematic perspective view illustrating a flexible display panel according to another exemplary embodiment.

FIG. 6 is a schematic perspective view illustrating a flexible display panel 200 according to another exemplary embodiment.

The flexible display panel 200 of FIG. 6 is different from the flexible display panel 100 of FIG. 1 in that a second display D2 is positioned only on a side of a first display D1.

The flexible display panel 200 includes the first display D1 and the second display D2 which extends from the side of the first display D1. A non-display area NA is disposed at edges of the first and second displays D1 and D2. The first display D1 may be a main display screen of the flexible display panel 200. The second display D2 may be a sub display screen of the flexible display panel 200.

The first and second displays D1 and D2 may include a plurality of pixels having various types of display devices (not shown), such as at least one or more organic light-emitting displays, liquid crystal displays (LCDs), electrophoretic devices, etc., and at least one or more thin film transistors (TFTs), and storage capacitors, etc.

Although not shown in FIG. 6, the flexible display panel 200 and a touch panel corresponding to the shape of the flexible display panel 200 may be combined into a display device.

The second display D2 forms the curved surface in the previous exemplary embodiment. However, the present exemplary embodiment is not limited thereto, and a boundary area between the first and second displays D1 and D2 may form a curved surface, and the second display D2 may have a flat shape.

Figure 7:
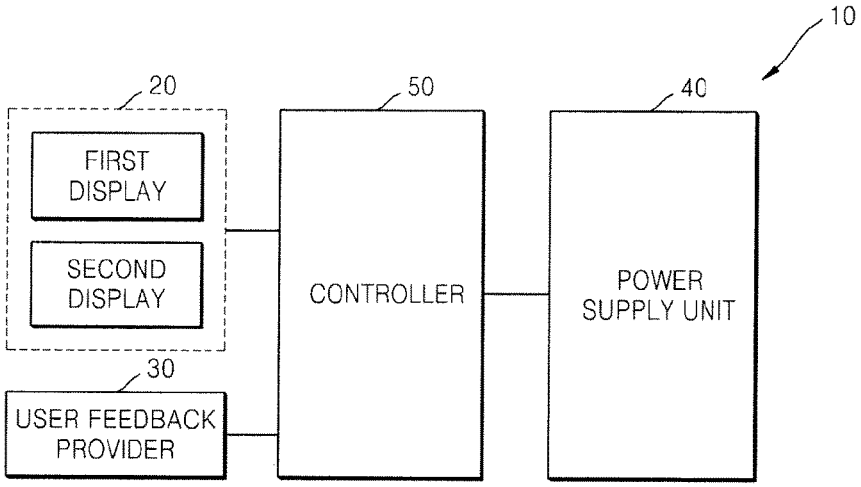
FIG. 7 is a schematic block diagram illustrating a structure of a display device in which a flexible display panel is installed, according to an exemplary embodiment.

FIG. 7 is a schematic block diagram illustrating a structure of the display device 10 in which a flexible display panel is installed, according to an exemplary embodiment.

Referring to FIG. 7, the display device 10 includes a display 20, a user feedback provider 30, a power supply unit 40, and a controller 50.

The display 20 displays an image which is captured by a camera (not shown) installed in the display device 10 or is received from an external source by wire or wireless, a UI, or a graphic user interface (GUI). The display 20 may display various types of state information, numbers, characters, images, etc., occurring when the display device 10 operates. The display 20 may be constituted as the flexible display panel 100, with which a touch panel forms a single body, to be used as an output unit and/or an input unit.

The display 20 includes a first display D1 and a second display D2 which is disposed on both sides of the first display D1 and is bent at a boundary between the first and second display D1 and D2. The display 20 includes a touch panel to receive a touch input.

The user feedback provider 30 generates various types of tactile effects felt by a user like a vibration and acoustic effects such as sounds under control of the controller 50.

The power supply unit 40 receives an external and/or internal power source to supply power for operations of elements of the display device 10. The power supply unit 40 may include a rechargeable battery. The power supply unit 40 may measure main parameters of the rechargeable battery such as charging, discharging, and a temperature. The power supply unit 40 controls power supplies to the first and second displays D1 and D2 under control of the controller 50.

The controller 50 controls an overall operation of the display device 10. For example, the controller 50 performs related controls and processing for a voice call, a data communication, a video telephony, etc. The controller 50 may control a screen of at least one of the first and second displays D1 and D2 according to a touch of the user or a capacity of the battery.

The controller 50 may control the screen of the at least one of the first and second displays D1 and D2 according to the touch of the user. If the display 20 receives touch inputs, the controller 50 detects a touch characteristic according to a combination of the touch inputs of the first and second displays D1 and D2 and generates different events according to the touch characteristic. The touch characteristic may be a touch position, the number of touches, a drag, or the like in the present invention but is not limited thereto. Therefore, various types of touch characteristics may be defined. Here, a touch refers to a state in which a finger of the user or a stylus pen contacts the display 20. Also, a drag refers to an operation which is to move a touch point when keeping a touch on the display 20.

The controller 50 may also control the screen of the at least one of the first and second displays D1 and D2 according to the capacity of the battery. The controller 50 may estimate a current voltage of the battery or a left time of the battery and control a screen of the display 20.

Therefore, the controller 50 may perform a function of controlling power of the display device 10 in the present exemplary embodiment.

Figure 8:
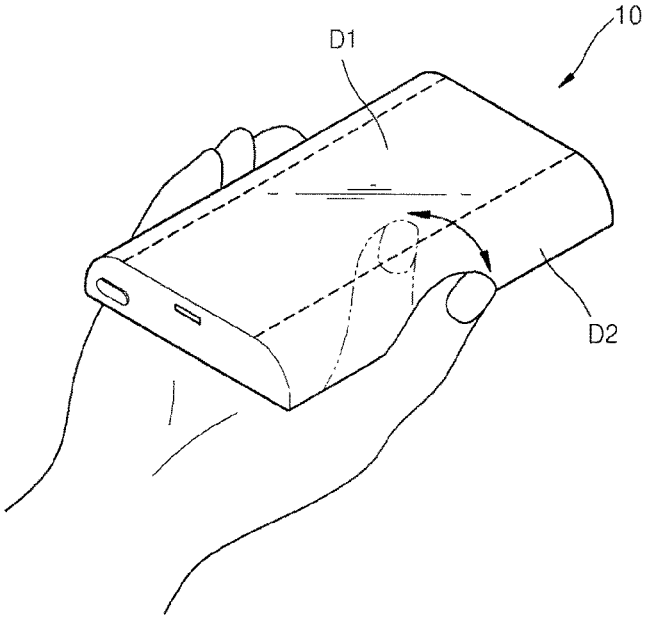
FIGS. 8 and 9 are schematic views illustrating a touch input of a display device in which a flexible display panel is installed, according to an exemplary embodiment.
Figure 9:
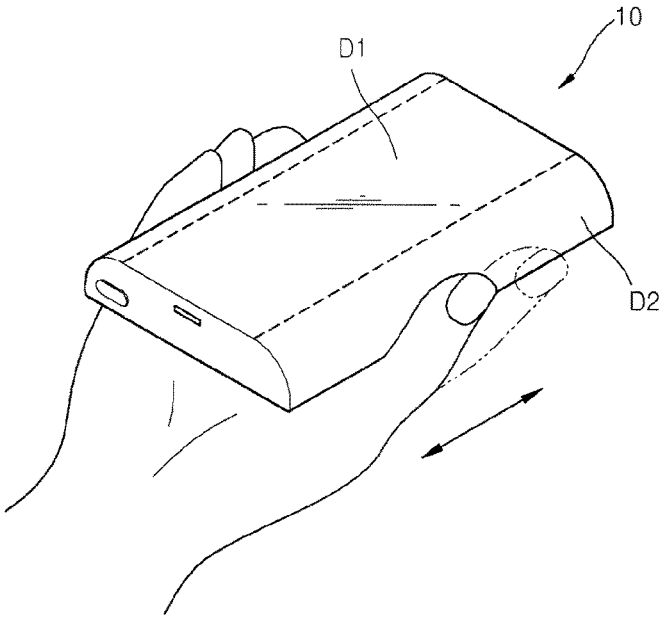

FIGS. 8 and 9 are schematic views illustrating touch inputs of the display device 10 including a flexible display panel, according to an exemplary embodiment.

The second display D2 of the present exemplary embodiment may provide a function such as a virtual jog dial or knob. Therefore, as shown in FIG. 8, the user may drag the second display D2 from a left side to a right side (or from a right side to a left side) like the jog dial or knob. For example, the user may perform a drag in a direction from the first display D1 to the second display D2 with a finger (e.g., a thumb).

Referring to FIG. 9, the user may drag the second display D2 from top to bottom (or from bottom to top). For example, the user may drag the second display D2 from the top to the bottom (or from bottom to top) with the finger (e.g., the thumb).

In the present exemplary embodiment, a 2-dimensional (2D) coordinate (x, y) obtained by a 2D touch of the first or second display D1 or D2 and drag information of the second display D2 may be received and then extend into a 3-dimensional (3D) coordinate (x, y, z) or (x, y, depth or zoom) by using the 2D coordinate and the drag information.

Figure 10:
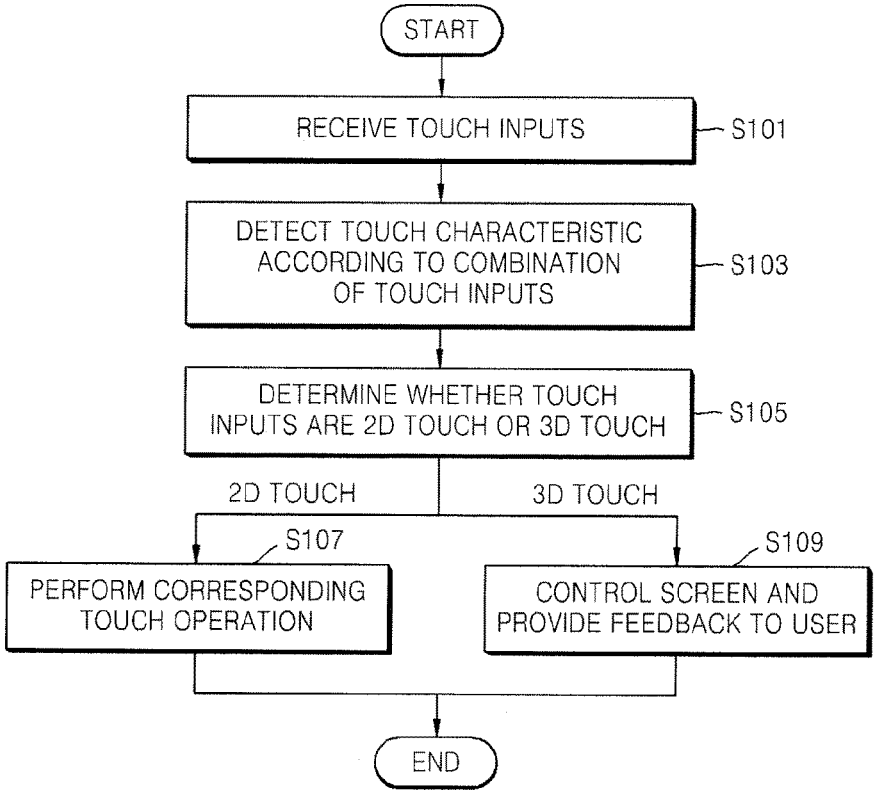
FIG. 10 is a flowchart illustrating a method for controlling a display image of a display device including a flexible display panel according to an exemplary embodiment.

FIG. 10 is a flowchart illustrating a method for controlling a display image of a display device including a flexible display panel according to an exemplary embodiment. The method of the present exemplary embodiment refers to a method for controlling a screen of the display device based on a touch of a user. Depending on the embodiment, additional operations may be added, others removed, or the order of the operations may change in FIG. 11. This applies to the embodiments of FIGS. 11, 14 and 15.

In operation S101, the controller 50 receives touch inputs from the display 20. In operation S103, the controller 50 combines the touch inputs of the first and second displays D1 and D2 in order and detects a touch characteristic according to the combination of the touch inputs.

In operation S105, the controller 50 determines whether the touch inputs are 2D touches or 3D touches, based on the touch characteristic. The controller 50 may determine a touch type in consideration of whether the touch inputs are a drag of the second display D2 subsequent to a 2D touch operation or which area a drag has occurred in. If the detected touch characteristic includes a left and right or up and down drag of the second display D2, the controller 50 may determine the touch type as a 3D touch. In some embodiments, the 3D touch refers to a touch including a left and right drag operation of the second display D2 subsequent to a 2D touch of the first display D1 or a drag of the second display D2 such as a single up and down or left and right drag operation of the second display D2. Here, the 2D touch refers to a touch such as a one-time touch of the first or second display D1 or D2, consecutive two time touches, or a drag of the first display D1.

If it is determined in operation S105 that the touch inputs are the 2D touch, the controller 50 performs an operation corresponding to each touch characteristic. For example, if the touch inputs are a one-time touch of the first or second display D1 or D2, the controller 50 may perform a click function. If the touch inputs are the two time touch, the controller 50 may perform a double click function. If the touch inputs are the drag of the first display D1, the controller 50 may perform a scroll function. Here, a scroll means that a content displayed on a screen of the display 20 move up and down or from side to side.

If the touch inputs are the 3D touch, the controller 50 controls the screen of the display 20 and provides a feedback to a user according to a display mode type in operation S109. For example, if a touch characteristic in which the drag of the first display D1 and then the left and right drag of the second display D2 are consecutive when a scrollable image is displayed on the first display D1, the controller 50 may scroll the image and zoom in or out an image selected by the scroll. A zoom magnification of the image may be adjusted according to a drag time or a touch pressure of the second display D2. Here, the controller 50 may transmit a control signal to the user feedback provider 30 so that the user feedback provider 30 may provide the user with a vibration or a sound which is a haptic function at the same time as a zoom function is performed.

Figure 11:
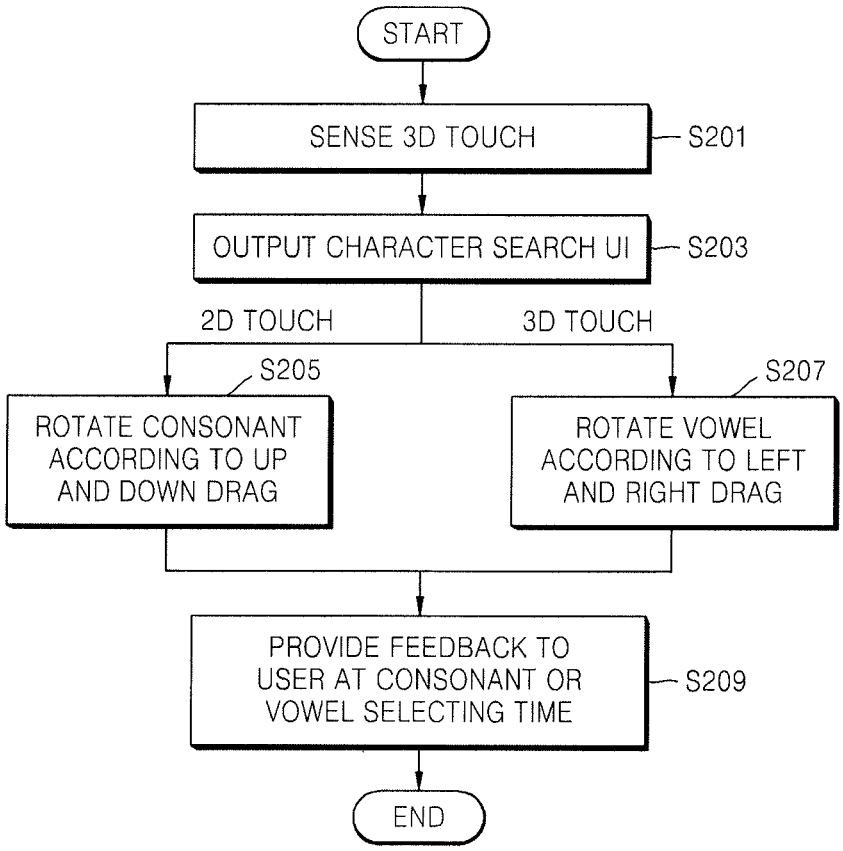
FIG. 11 is a flowchart schematically illustrating a method for inputting characters according to an exemplary embodiment.
Figure 12:
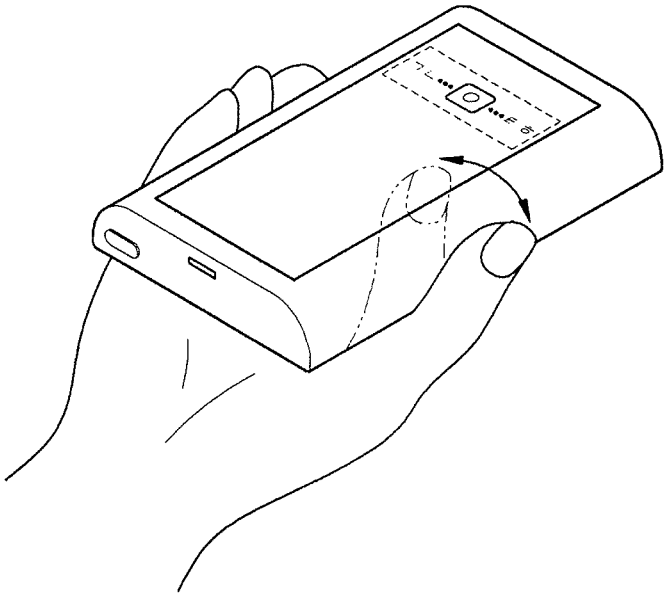
FIGS. 12 and 13 are views illustrating an example of the method of FIG. 11.
Figure 13:
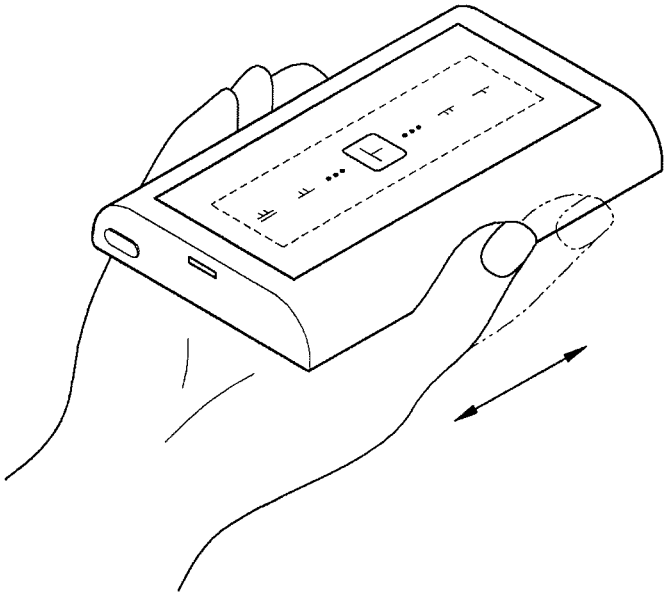

FIG. 11 is a flowchart schematically illustrating a method for inputting characters according to an exemplary embodiment. FIGS. 12 and 13 are views illustrating an example of the method of FIG. 11.

When a display mode of the display 20 is a character input mode, a 3D touch is sensed in operation S201. In operation S203, the controller 50 outputs a character search UI to the first display D1.

If a user left and right drags the second display D2 as shown in FIG. 12, the controller 50 performs a scroll operation which is to rotate a consonant through the character search UI in operation S205. If the user up and down drags the second display D2 as shown in FIG. 13, the controller 50 performs a scroll operation which is to rotate a vowel through the character search UI in operation S207. However, the present invention is not limited thereto, and the controller 50 may perform a vowel scroll operation through a left and right drag and perform a consonant scroll operation through an up and down drag.

In operation S209, the controller 50 provides the user with a feedback as a vibration or a sound through the user feedback provider 30 at a time when scrolling a consonant or a vowel or a time when selecting the consonant or the vowel.

An example of a character input is described in the above-described exemplary embodiment, but an input of a number or a symbol may be performed through a scroll operation by a drag of the second display D2.

In the present exemplary embodiment, the user may hold the display device 10 such as a portable terminal with a hand to touch the second display D2 with only a thumb in order to perform a scroll operation and a character input of the display device 10. Also, since all of left and right sides of the display device 10 are used, this may be applied regardless of a left or right hand of the user.

Figure 14:
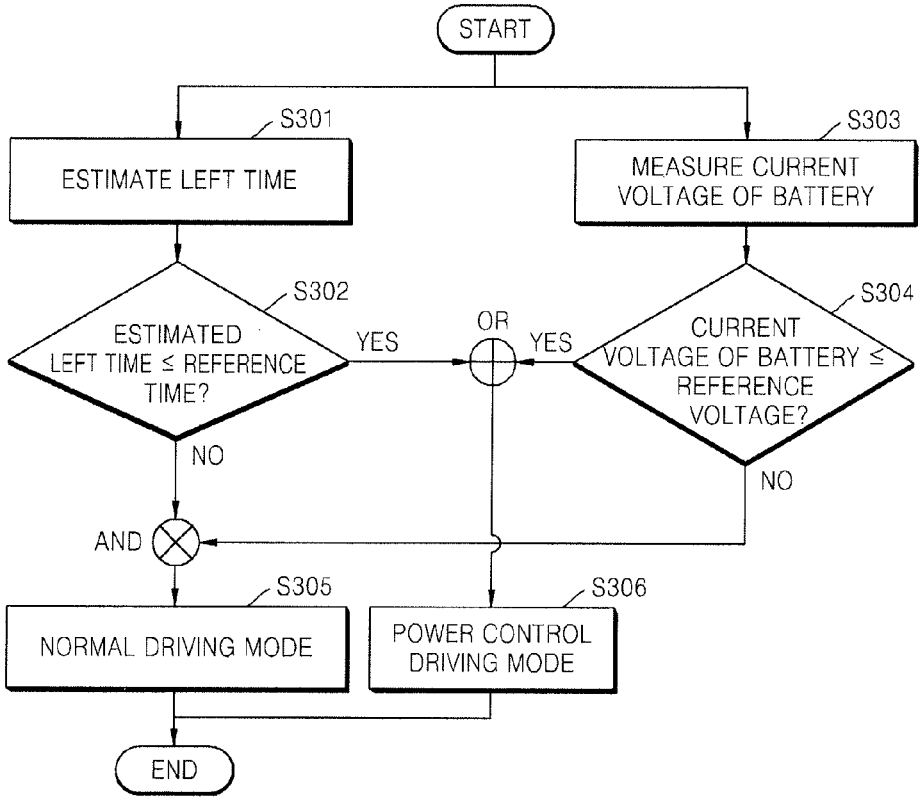
FIGS. 14 and 15 are flowcharts illustrating a method for controlling a display image of a display device according to another exemplary embodiment.
Figure 15:
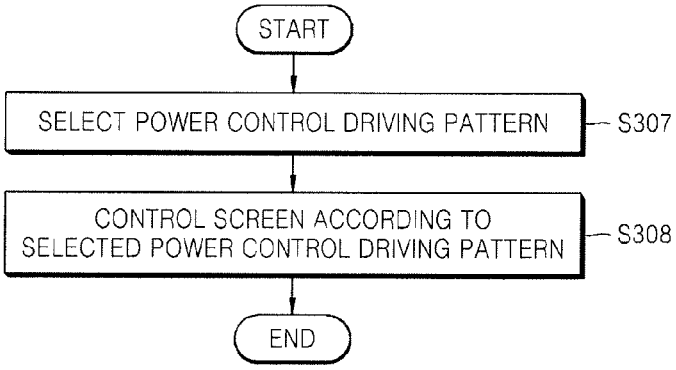

FIGS. 14 and 15 are flowcharts illustrating a method for controlling a display image of a display device according to another exemplary embodiment. FIGS. 16A through 16G are views illustrating screen controlling patterns according to various exemplary embodiments.

The method of the present exemplary embodiment is a method for controlling a screen of the display device based on a capacity of a battery. In other words, contents are displayed on the whole display 20, i.e. the first and second displays D1 and D2, in a normal state of the battery having a sufficient left time and a sufficient voltage. However, if the voltage or the left time becomes lower than a level predefined by a manufacturer or a user, a power control driving mode may be applied.

In operation S301, the controller 50 estimates the left time. In operation S302, a determination is made as to whether the estimated left time is shorter than or equal to a reference time. The reference time refers to a minimum left time preset by the user or the manufacturer. The left time T_left may be calculated by using a current consumption and a temperature of the battery. The current consumption refers to a total amount of current (I) currently (or at a measurement time) consumed in a user terminal. The temperature of the battery refers to a current temperature of the battery (that is, a temperature of the battery at the measurement time). Efficiency of the battery depends on the temperature, and thus the temperature of the battery is additionally considered. The left time T_left may be calculated by Equation below;

$$T_left = \frac{TotalBatteryCapacity}{Avr_Curr_con_T} \times \frac{BatteryEfficiency}{Var_Curr_Con_T}$$

wherein Avr_Curr_con_T denotes an average of current consumptions for a predetermined time T, and Var_Curr_con_T denotes a dispersion of the current consumptions. If the left time is estimated in consideration of only the average of the current consumptions, an error is great. Therefore, variations in the current consumptions are additionally considered. The efficiency of the battery may be calculated from a database (DB) including a discharging characteristic of the battery depending on the temperature. The DB may be pre-stored in a storage means such as a memory.

In operation S303, the controller 50 measures a current voltage of the battery. In operation S304, the controller 50 determines whether the current voltage of the battery is lower than or equal to a reference voltage. The reference voltage is a minimum voltage preset by a user or a manufacturer. The reference voltage may be changed by the user.

Figure 16A:
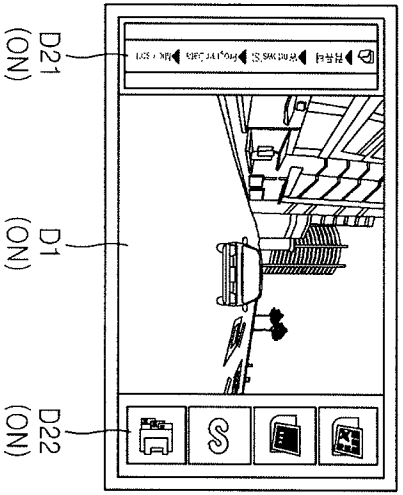
FIGS. 16A through 16G are views illustrating various types of screen controlling patterns according to various exemplary embodiments.

If the left time is longer than or substantially equal to the reference time, and the current voltage of the battery is higher than or substantially equal to the reference voltage, the controller 50 changes a current mode to a normal driving mode in operation S305. Therefore, contents are provided to the first and second displays D1 and D2 as shown in FIG. 16A.

If the left time is shorter than or substantially equal to the reference time, and the current voltage of the battery is lower than or substantially equal to the reference voltage, the controller 50 changes the current mode to a power control driving mode in operation S306. The power supply unit 40 may reduce or stop a supply of power to at least one of the first and second displays D1 and D2. Therefore, outputting of contents on a screen of at least one of the first and second displays D1 and D2 may be limited.

In operation S307, the controller 50 selects a screen controlling pattern of the first and second displays D1 and D2 in the power control driving mode. The controller 50 may control the power supply unit 40 to supply power to the display 20 according to the selected screen controlling pattern.

Figure 16B:
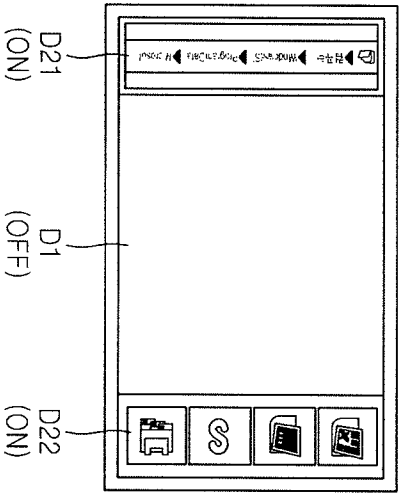
Figure 16C:
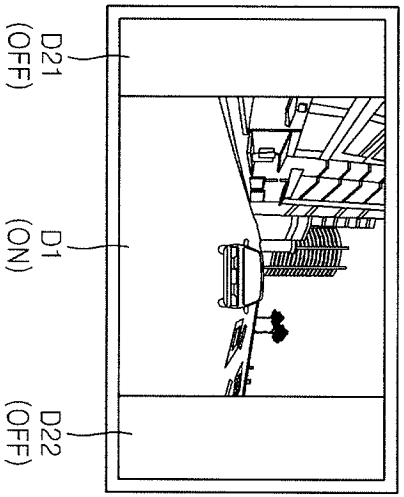
Figure 16D:
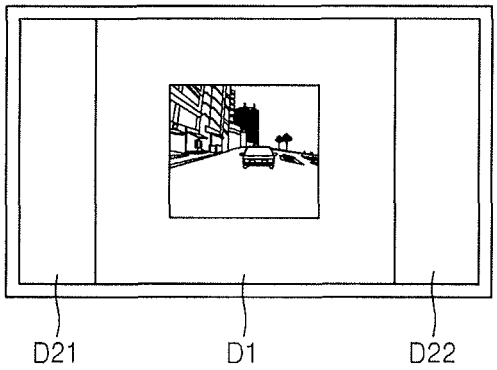
Figure 16E:
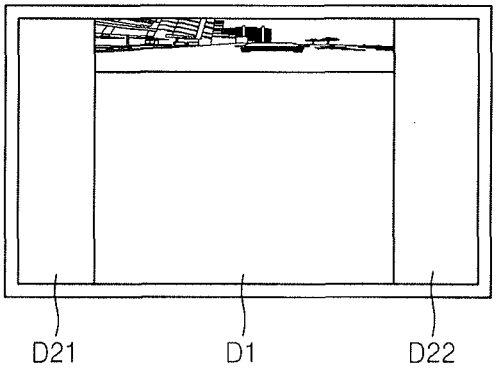
Figure 16F:
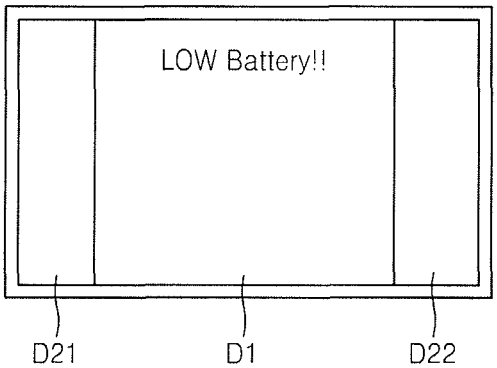
Figure 16G:
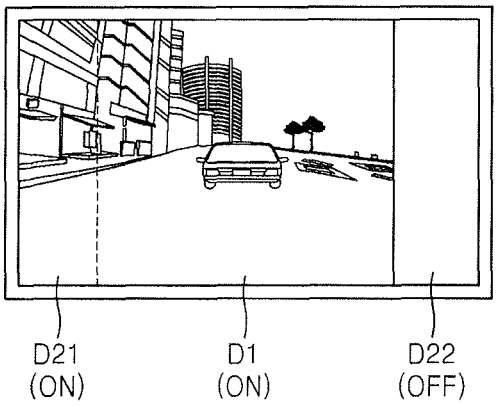

In operation S308, the controller 50 controls a screen according to the selected screen control pattern. Therefore, only the second display D2 may display contents as shown in FIG. 16B, only the first display D1 may display a content as shown in FIG. 16C, or the first display D1 and only some of the second display D2 may display a content as shown in FIG. 16G. The content of the first display D1 may be reduced to be displayed in an area of the first display D1 as shown in FIGS. 16D and 16E. Alternatively, not the content but a message related to a left capacity of the battery may be displayed on the first and second displays D1 and D2 as shown in FIG. 16F. Screen controlling patterns may be allocated according to the left capacity (or a left time or voltage), and the controller 50 may select a screen controlling pattern according to the left capacity of the battery to control the screen.

A power control using only a voltage of a battery may be performed by using a simple structure, but a power control according to a use pattern or environment of a user may be impossible. According to an exemplary embodiment, the user may perform a power control according to a left time estimation, which is based on data a current consumption used by the user at a current time and a previous consumption and information about the battery, in order to enable the power control according to the use pattern or environment of the user. Also, a power control method for providing contents to some area of the display 20 may be applied to effectively extend a left time of the battery in a low voltage situation.

According to at least one of the disclosed embodiments, a screen may be controlled by a touch of a bent side of a flexible display device to increase uses of a user. Also, the screen may be controlled according to a capacity of a battery of the flexible display device to improve efficiency of power uses.

While the above embodiments have been described with reference to the accompanying drawings, it will be understood by those of ordinary skill in the art that various changes in form and details may be made therein without departing from the spirit and scope of the present invention as defined by the following claims.

What is claimed is:

1. A display device comprising:

a first display having a [substantially] flat shape, wherein the first display comprises two opposing sides;

a second display disposed on at least one of the two sides of the first display and having a curved surface bent at a boundary between the first and second displays, *wherein the second display is surrounded by a non-display portion that is not visible from outside the display device*; and a controller configured to control a screen of at least one of the first and second displays based on a user touch of the display device, wherein the controller is configured to detect a touch characteristic according to [the] *a* combination of touch inputs of the first and second displays, wherein the controller is configured to generate an event corresponding to the touch characteristic and provide feedback to the user, if the touch inputs comprise a drag of the second display having the curved surface, and wherein if the touch characteristic is the drag of the second display in a text input mode, the controller is further configured to output a character search UI to the first display and rotate vowels *in an up and down direction* through the character search UI according to an up and down *drag* of the second display and rotate consonants *in a left and right direction* through the character search UI according to a left and right drag of the second display.

2. The display device of claim 1, wherein the feedback comprises at least one of a vibration and a sound.

3. The display device of claim 1, wherein the controller is further configured to control the screen of the at least one display of the first and second displays to be turned on or off by reducing or stopping a supply of power to at least one of the first and second displays according to remaining battery capacity.

4. The display device of claim 3, wherein the controller is further configured to estimate remaining battery lifetime based at least partially on remaining battery capacity and wherein, if the remaining battery lifetime is shorter than or [substantially] equal to a reference time, the controller is further configured to change a mode to a power control driving mode which is to turn off at least part of the screen of the at least one display.

5. The display device of claim 4, wherein the controller is further configured to calculate the remaining battery lifetime based at least partially on current consumption and temperature of [the] *a* battery.

6. The display device of claim 3, wherein the controller is further configured to measure battery voltage and, wherein, if the measured voltage is lower than or [substantially] equal to a reference voltage, the controller is further configured to change a mode to a power control driving mode which is to turn off at least part of the screen of the at least one display.

7. A method for controlling a display image of a display device, the method comprising:

providing a display device that comprises 1) a first display having a [substantially] flat shape, wherein the first display comprises two opposing sides and 2) a second display disposed on at least one of the two sides of the first display and having a curved surface bent at a boundary between the first and second displays, *wherein the second display is surrounded by a non-display portion that is not visible from outside the display device*; and controlling a screen of at least one of the first and second displays based on a user touch of the display device, wherein the controlling comprises:

receiving touch inputs of the first and second displays;

detecting a touch characteristic according to [the] *a* combination of the touch inputs; and generating an event corresponding to the touch characteristic and providing feedback to the user, if the touch inputs comprise a drag of the second display having the curved surface, and wherein the generating comprises: if the touch characteristic is the drag of the second display in a text input mode, outputting a character search UI to the first display and rotating vowels *in an up and down direction* through the character search UI according to an up and down *drag* of the second display and rotating consonants *in a left and right direction* through the character search UI according to a left and right drag of the second display.

8. The method of claim 7, wherein the generating comprises:

if the touch characteristic is a drag of the first display in an image selecting mode, scrolling an image according to the drag of the first display; and if the touch characteristic is detected as a drag of the second display subsequent to the drag of the first display, zooming in or out the scrolled image according to the drag of the second display.

[9. The method of claim 7, wherein the generating comprises: if the touch characteristic is the drag of the second display in a text input mode, scrolling and outputting a character search UI to the first display and rotating vowels or consonants through the character search UI according to an up and down or left and right drag of the second display.]

10. The method of claim 7, wherein the controlling further comprises:

estimating remaining battery lifetime based at least partially on remaining battery capacity; and if the remaining lifetime is shorter than or [substantially] equal to a reference time, changing a mode to a power control driving mode which is to turn off at least part of the screen of the at least one display of the first and second displays by reducing or stopping a supply of power to at least one of the first and second displays.

11. The method of claim 10, wherein the estimating comprises:

estimating battery lifetime based on current consumption and battery temperature.

12. The method of claim 7, wherein the controlling comprises:

measuring battery voltage; and if the measured battery voltage is lower than or [substantially] equal to a reference voltage, changing a mode to a power control driving mode which is to turn off at least part of the screen of the at least one display of the first and second displays by reducing or stopping a supply of power to at least one of the first and second displays.

13. A display device comprising:

a first display having a [substantially] flat shape, wherein the first display comprises two opposing sides;

a second display disposed on at least one of the two sides of the first display and having a curved surface bent at a boundary between the first and second displays, wherein a non-display portion surrounds the second display;

a controller configured to control a screen of at least one of the first and second displays based at least partially on a user touch and/or a battery capacity of the display device; and a housing supporting the first and second displays, wherein the housing comprises an upper case contacting the first and second displays and a lower case facing the upper case, and wherein the non-display portion is inwardly bent from the second display such that the second display and the bent portion at least partially surround the upper case, wherein the controller is configured to detect a touch characteristic according to [the] *a* combination of touch inputs of the first and second displays, wherein the controller is configured to generate an event corresponding to the touch characteristic and provide feedback to the user, if the touch inputs comprise a drag of the second display having the curved surface, and wherein if the touch characteristic is the drag of the second display in a text input mode, the controller is further configured to output a character search UI to the first display and rotate vowels or consonants through the character search UI according to an up and down or left and right drag of the second display.

14. The display device of claim 13, wherein the non-display portion is not visible.

15. The display device of claim 13, wherein the controller is further configured to control the screen of at least one display of the first and second displays to be turned on or off by reducing or stopping a supply of power to at least one of the first and second displays according to remaining battery capacity.

16. The display device of claim 13, wherein if the touch characteristic is consecutive drags of the first and second displays in an image selecting mode, the controller is further configured to zoom in or out an image, which is scrolled according to the drag of the first display, according to the drag of the second display.

17. The display device of claim 15, wherein the controller is further configured to estimate remaining battery lifetime based at least partially on remaining battery capacity and wherein, if the remaining battery lifetime is shorter than or [substantially] equal to a reference time, the controller is further configured to change a mode to a power control driving mode which is to turn off at least part of the screen of the at least one display.

18. The display device of claim 15, wherein the controller is further configured to measure battery voltage and, wherein, if the measured voltage is lower than or [substantially] equal to a reference voltage, the controller is further configured to change a mode to a power control driving mode which is to turn off at least part of the screen of the at least one display.

19. The display device of claim 1, further comprising a housing supporting the first and second displays, wherein the housing comprises an upper case contacting the first and second displays and a lower case facing the upper case, and wherein [a non-display portion surrounds the second display and] the non-display portion is inwardly bent from the second display such that the second display and the bent portion at least partially surround the upper case.

20. The display device of claim 17, wherein an opening is formed only between edges of the upper and lower cases, and wherein the non-display portion is formed only in and adjacent to the opening.

*21. The display device of claim 1, further comprising a touch panel corresponding to the first and second displays.*

* * * * *